United States Patent [19]
Cicatelli

[11] 4,337,489
[45] Jun. 29, 1982

[54] DEVICE FOR THE PROGRAMMED CONTROL OF OPERATIVE SEQUENCES, IN PARTICULAR FOR CASSETTE-TYPE TAPE RECORDERS

[75] Inventor: Rodolfo Cicatelli, Gandria, Switzerland

[73] Assignee: Autovox S.p.A., Rome, Italy

[21] Appl. No.: 34,213

[22] Filed: Apr. 30, 1979

[30] Foreign Application Priority Data

May 5, 1978 [IT] Italy ............................... 49214 A/78

[51] Int. Cl.³ ...................... G11B 15/26; G11B 23/04
[52] U.S. Cl. ................................... 360/96.5; 242/197; 360/71; 360/93
[58] Field of Search ................... 360/96.5, 96.6, 96.1, 360/93, 105, 71; 242/197–198, 207–210; 74/89.17; 185/40 R

[56] References Cited

U.S. PATENT DOCUMENTS

| | | | |
|---|---|---|---|
| 3,572,723 | 3/1971 | Jenkins et al. | 360/93 |
| 3,669,455 | 6/1972 | Cicatelli | 360/93 |
| 3,781,016 | 12/1973 | Benton et al. | 360/96.5 |
| 4,014,041 | 3/1977 | Cicatelli | 360/96.5 |
| 4,128,015 | 12/1978 | Cicatelli | 74/89.17 |

*Primary Examiner*—Alfred H. Eddleman
*Attorney, Agent, or Firm*—Ladas & Parry

[57] ABSTRACT

Device for the programmed control of the operative sequences for a cassette-type tape recorder having a tape transport mechanism moved by a motor and a support for the magnetic heads and for the pressure roller, which device comprises: a shaft which can be rotatably moved in a predetermined direction by a wheelwork connected to said motor; a spring which tends to cause the rotation of said shaft in the opposite direction; first, second, third and fourth control means disposed on said shaft; means of introduction and expulsion of the cassette sensible to said first control means; means for lowering and for raising the cassette sensible to said second control means; approach and removal means to and from the cassette of the support for the magnetic heads and the pressure roller, sensible to said third control means; and engagement and disengagement means for the wheelwork, sensible to said fourth control means.

13 Claims, 5 Drawing Figures

DEVICE FOR THE PROGRAMMED CONTROL OF OPERATIVE SEQUENCES, IN PARTICULAR FOR CASSETTE-TYPE TAPE RECORDERS

BACKGROUND OF THE PRESENT INVENTION

The present invention relates to a device for the programmed control of operative sequences, particularly suitable for cassette-type tape recorders.

In a cassette-type tape recorder, in order to automatically set a cassette into its operative position and reject it from the recorder, it is necessary to utilize a device, which can store or memorize the operative sequences which relate to some or all of the following controls to be effected in the right time sequence:

slipping-in of the cassette towards the inside of the apparatus;

downward pull of the cassette to the operative position, where the cassette reels are engaged by a tape transport mechanism;

entering of the magnetic head and of the pressure roller, located on a suitable support, in the opposite openings of the cassette;

setting in the operative position of the control key for the fast forward and fast rewind movements of the tape.

While the control sequence must take place in the aforementioned, i.e., direct succession when the recorder is being prepared for operation, the same sequence must take place in a reverse succession when the operation of the recorder is being stopped and the cassette is to be removed.

In general, it is desirable that one of the two operative sequences, i.e. the sequence in the direct succession or the sequence in the reverse succession, takes place under the control of an elastic element, while the other sequence may be realized through a manual key or by a servomotor.

In the design of said devices for the programmed control of operative sequences, two main problems have been encountered.

The first problem relates to the centralization of the control of the actuating devices of the controls into a single element to assure the desired operative sequence.

Said centralization is hampered in the first place by the fact that some of the desired movements must be linear while others must be angular; and in the second place by the fact that the actuating devices are generally disposed on different planes and are generally disposed, with respect to each other, at different angular positions. An additional obstacle to the centralization is given by the receiprocal distances of the various devices actuating the movements.

Another problem is that of reducing as much as possible the difference between the percentage elongation of the elastic element at the beginning and at the end of the operative movement, in order to have a substantially constant force during the entire operative sequence which it controls. In other words, the final force exercized by the almost run-down elastic element must be only slightly less than the initial force exercized by the fully charged elastic element.

The reduction of the difference between the percentage elongations of the elastic element is hampered by the limitation of the dimensions of the recorder, dimensions which must always be respected, in contrast to the fact that the elastic elements must have dimensions sufficient to provide the force necessary for the operation of the apparatus.

In Italian Pat. Nos. 848,887 and 1,004,253 (U.S. Pat. Nos. 3,669,455 and 4,014,041) there have been described two devices of this type, in the first of which both the direct succession and the reverse succession are realized manually. The device described in Italian Pat. No. 1,004,253 (U.S. Pat. No. 4,014,041) comprises an elastic element which effects the direct or setting succession in an automatic manner at the moment of introduction of the cassette, while a manual control provides for the execution of the reverse succession to eject the cassette at the end of the play cycle. In both of the known devices a programming element is moved linearly to realize the right operative sequence.

From the German Pat. No. 27 04 354 (corresponding to Italian Patent Application No. 47,849 A 76) and issued U.S. Pat. No. 4,128,015 is also known a device of the type in question, in which the programming element is moved linearly by a wheelwork connected to the motor of the recorder, during the execution of the direct sequence. During this phase, the motor also charges a linear elastic element, the discharge of which elastic element will then be utilized to effect the reverse sequence of the operations when it is desired to interrupt the operation of the recorder or also simply when the power lacks. However, such known devices suffer from the disadvantages of a poor centralization and a great difference between the percentage elongation of the spring.

SUMMARY OF THE INVENTION

To eliminate the disadvantages of the known devices, according to the present invention there is provided a device for the programmed control of operative sequences comprising: a shaft which can be rotatably moved in a predetermined direction by a wheelwork connected to the motor of the recorder; a spring which tends to cause the rotation of said shaft in the opposite direction; first, second, third and fourth control means disposed on said shaft; means of introduction and of ejection of the cassette sensible to said first control means; means for lowering and for raising the cassette sensible to said second control means; approach and removal means to and from the cassette of the support for the magnetic heads and the pressure roller, sensible to said third control means; and engagement and disengagement means for the wheelwork, sensible to said fourth control means.

Through the use of the control shaft, i.e. through the use of a control member which is movable angularly rather than linearly, is now possible a better centralization, in a single element, of the controls of both the linear and the angular movements, with the actuators disposed on different planes.

The use of a spring to angularly stress said shaft permits to maintain within few percentages the difference between the precentage elongations of the spring and thus to have a substantially constant force during all the operative phases executed under the control of the spring itself.

BRIEF DESCRIPTION OF THE DRAWINGS

A realization of the device according to the invention will now be described, by way of example and not of limitation, with reference to the attached drawings, in which.

DESCRIPTION OF THE PREFERRED EMBODIMENT

Figure 1:
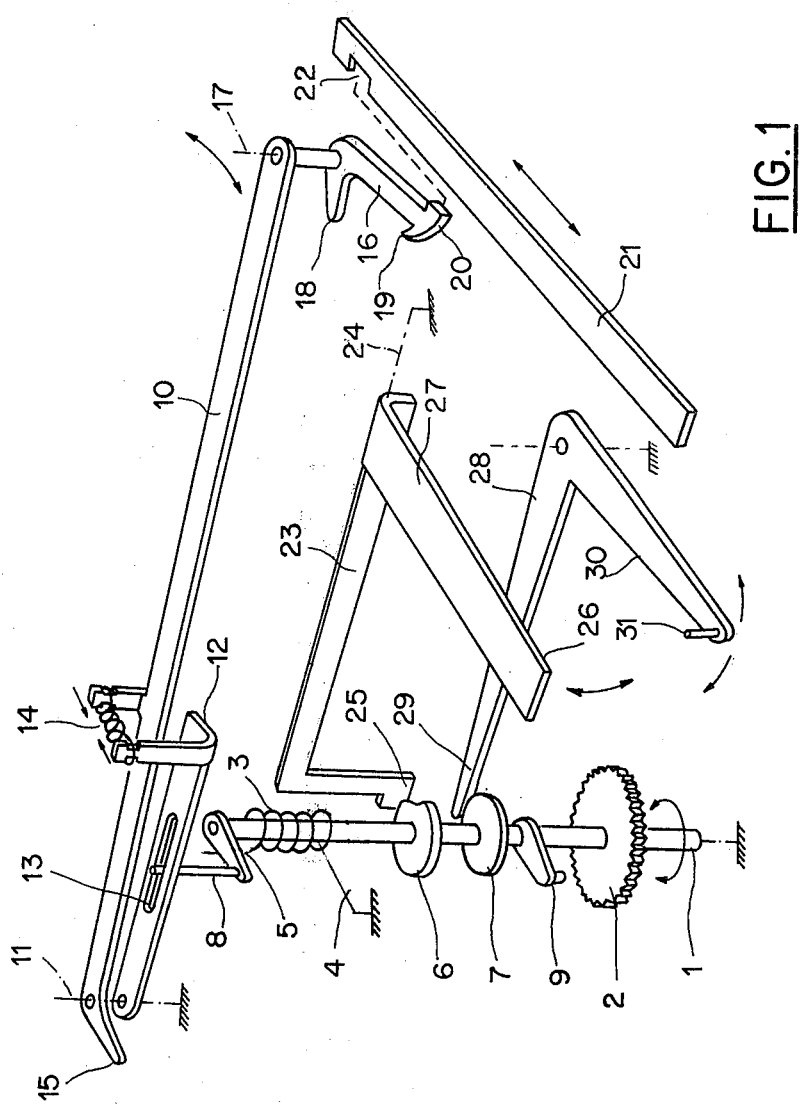
FIG. 1 is a basic scheme of a device according to the invention.
Figure 2:
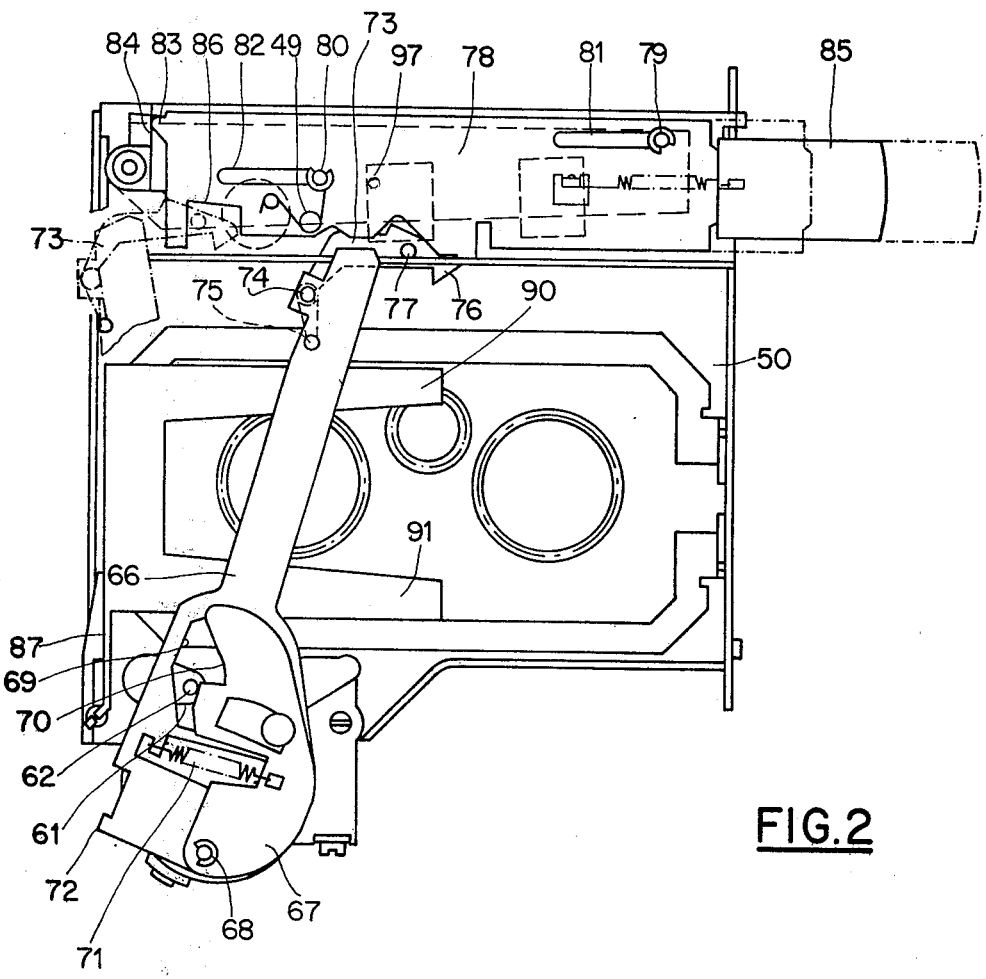
FIG. 2 is a plan view of a tape recorder incorporating the device of the invention.
Figure 4:
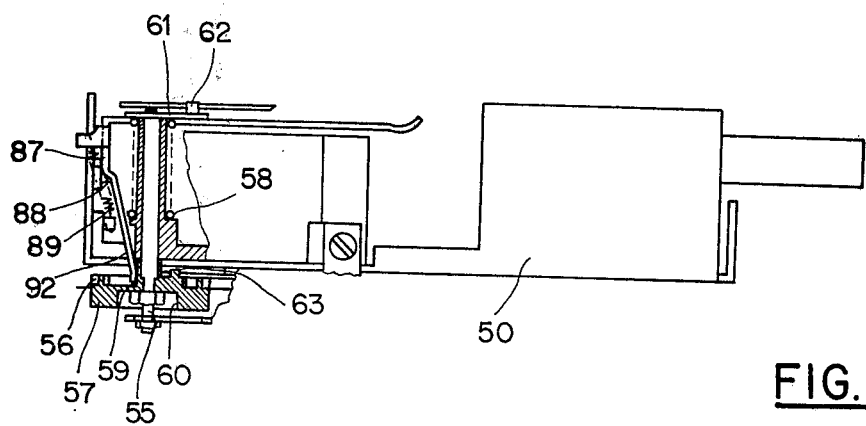
FIGS. 4 and 5 are side views, partially in section, made along the line IV—IV of FIG. 3, and show respectively the recorder in the rest position and in the operative position.

With reference to the basic scheme of FIG. 1, the device of programmed control of the invention comprises a shaft 1, rotatable on bearings (not shown) integrally mounted with the frame of the tape recorder.

The shaft 1 may be rotatably operated by means of a gear 2 and has mounted thereon command or control means which can act on the various actuating devices, as well as an elastic element, in the form of a helicoidal spring, torsionally operated, and having a first end 4 fixed to the frame and its other end 5 fixed to the shaft 1. The spring 3 acts as the storage member of the required work force.

The command means which act on the various actuators are represented, in these realizations, by two cams 6 and 7 and by two pins 8 and 9, which, with their shapes and, respectively, with their angulations, set the operative program or the operative sequence.

The group starting the motor of the tape recorder and the introduction and ejection of the cassette comprises a lever 10, hinged on the frame at 11, and a second lever 12, also hinged on the frame at 11 and having a slot 13 within which the pin 8 moves. The two levers 10 and 12 are maintained near each other by the action of spring 14.

The lever 10 also presents an appendix 15 at one of its ends and a hook 16 at its other end. The hook 16 is bound to the lever 10 rotatably around a pivot pin 17 and has an appendix 18 and a hook-shaped end 19.

The hook 16 presents also a protuberance 20, while a cursor 21 is reciprocable with respect to the frame from an innermost, inoperative position and an outermost, operative position, in which a key (not shown), transversally movable with respect to the cursor 21, projects from the recorder and may be manually operated for the execution of fast movements of the tape. The cursor 21 presents a notch 22, which may engage the protuberance 20, as will be better explained in the following discription.

The cassette lowering and raising group comprises a pivot lever 23, rotatable around an axis 24 and having an arm 25. The end of the arm 25 cooperates with the cam 6 to cause the rotation of the pivot lever 23 and thus to lower or raise the end 26 of a second arm 27, which is integral with it.

A spring, not shown, serves to maintain the end of the arm 25 in contact with the cam 6.

The group controlling the support for the magnetic heads and for the pressure roller comprises an elbow lever 28, a first arm 29 of which cooperates with the cam 7 and the other arm of which carries a pin 31 intended to engage the support which carries the magnetic heads, not shown for the sake of clarity.

The pin 9 then controls, according to its position, through a known mechanism, the engagement and disengagement of the transmission between the motor of the recorder and the gear 2.

The operation of the present device is the following: by introducing the cassette in a suitable opening in the frontal part of the recorder, it comes into contact with the appendix 18 of the hook 16 causing first the rotation, toward the left as viewed in FIG. 1, of the hook 16, which engages the cassette with its hook-shaped end 19 and thus the rotation, against the action of the spring 14, in a counterclockwise direction as viewed in FIG. 1, of the lever 10, the appendix 15 of which causes the closure of a microswitch (not shown). Said microswitch thus closes the electric circuit of the motor of the recorder, causing the operation of the same.

Since the transmission between the motor and the gear 2 is now engaged, the shaft 1 will begin to rotate in a clockwise direction, thus charging the spring 3.

During the rotation of the shaft 1, the pin 8 moves within the slot 13 and causes the movement of lever 12, which at first recovers, through the spring 14, the slack toward the lever 10 and thereafter moves said lever 10 in a counterclockwise direction causing the end 19 of the hook 16 to draw in the cassette.

In this manner, the cassette is entered into the recorder, until the appendix 18 of the hook 16 hits against a stop (not shown in FIG. 1) integral with the frame. At said contact, the hook 16 rotates around pivot pin 17 in counterclockwise direction and frees the cassette, which is then lowered into the operative position by the engagement of the cam 6 with the arm 25, during the subsequent rotation of the shaft 1.

At the same time, the protuberance 20 of the hook 16 has engaged the notch 22 of the cursor 21, beginning to move it toward the outside since now pin 8 forces the lever 10 to rotate in a clockwise direction.

When the cassette has arrived in its lowered position, the cam 7 begins to act on the arm 29 of the lever 28, which causes the magnetic heads to approach the tape.

When the magnetic heads contact the tape contained in the cassette, the operation of setting the cassette in the operative position is terminated and the pin 9 serves now to disengage the transmission between the motor of the recorder and the gear 2. A suitable blocking system acts at this point on the shaft 1 and only the release of the blocking system permits the rotation of shaft 1 in a counterclockwise direction under the action of spring 3, causing the execution of the reverse sequence or of the ejection of the cassette, in a manner exactly opposite to that hereinbefore described.

At the end of the counterclockwise rotation of the shaft 1, the pin 9 finally effects the engagement of the transmission between the motor and the gear 2.

With reference to FIGS. 2-5, there will now be described a particular practical realization of the device shown schematically in FIG. 1, incorporated in a tape recorder having a frame 50 which supports a motor 51. The motor 51 activates, by means of a belt 52, a flywheel 53 and a wheel 54.

The frame 50 supports also a shaft 55, which corresponds to shaft 1 of FIG. 1, and the shaft 55 can be rotated in a counterclockwise direction (as viewed in FIG. 3) by the motor 51 through a wheel work which terminates with the gear 56, corresponding to the gear 2 of FIG. 1, and machined on the periphery of a wheel 57 integral with the shaft 55. A transmission of this type is better described in German patent application DE-OS No. 28 22 740 (corresponding to Italian Patent Application No. 49,612 A 77 and copending U.S. patent application Ser. No. 910,055, filed May 26, 1978).

Figure 3:
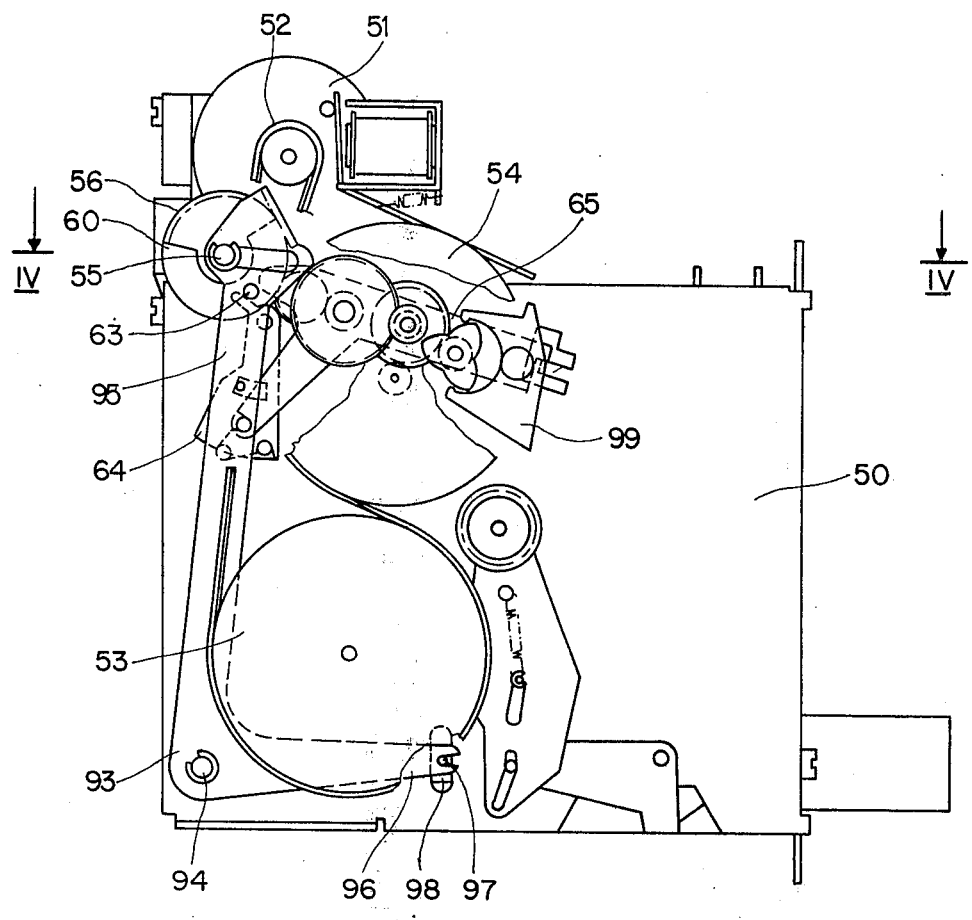
FIG. 3 is a bottom view of the recorder of FIG. 2.
Figure 5:
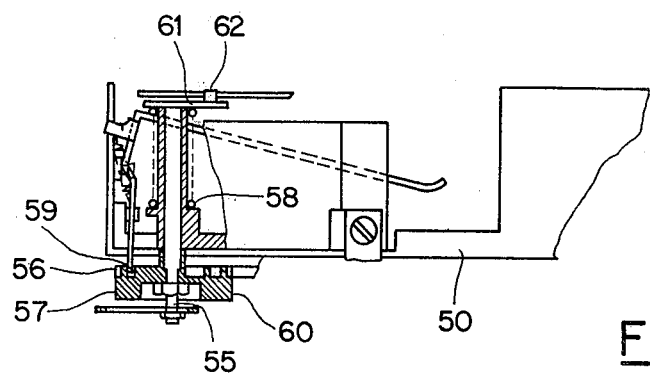

A spring 58, corresponding to the spring 3 of FIG. 1, serves to cause the rotation of shaft 55 in a clockwise direction, as viewed in FIG. 3.

In the wheel 57 there are also machined two cams 59 and 60, corresponding respectively to the cams 6 and 7 of FIG. 1. A crank 61, having a pin 62 corresponding to the pin 8 of FIG. 1 is fixed onto the pivot 55, while a pin 63, corresponding to pin 9 of FIG. 1, is integral with the wheel 57.

As better described in said German patent application DE-OS No. 28 22 740, the pin 63 activates, through a bistable element 64, a train carrier 65 of a train of serrated or toothed wheels, so as to initiate or interrupt a transmission of motion to the gear 56.

Two levers 66 and 67, corresponding respectively to the levers 10 and 12 of FIG. 1, are hinged onto a pivot 68 integrally mounted to the frame 50 and the two levers form with respect to each other a shaped profile 69, 70 corresponding to the slot 13 of FIG. 1, which is engaged by the pin 62. A spring 71 corresponding to the spring 14, serves to urge the two levers 66 and 67 to contact each other.

The lever 66 presents in addition an appendix 72, corresponding to the appendix 15 of FIG. 1, designed for the actuation of a microswitch, not shown for the sake of clarity.

A hook 73, corresponding to the hook 16 of FIG. 1, is connected to the lever 66 as to be rotatable about a pivot pin 74 and has an appendix 75, a hook-shaped end 76 and a protuberance 77.

A cursor 78 is reciprocable with respect to frame 50, same as the cursor 21 of FIG. 1, being connected by two pins 79, 80, free to slide into two slots 81, 82. In its innermost position, shown with a continuous line in FIG. 2, the cursor 78 touches by means of its pointed end 83 a tab 84, thus closing the electrical contact by grounding it, while in its outermost position, shown by dashed and dotted lines in FIG. 2, the cursor 78 supports at the outside of the frame 50 a push button 85, which is articulated with respect to said cursor and which thus assumes a position in which it can be manually swung for the execution of the fast movements of the tape.

The cursor 78 is moved by the hook 73, as will be better explained in the description which follows, since the protuberance 77 engages a notch 86 of the cursor 78.

A pivot lever 87, corresponding to the lever 23 of FIG. 1, is rotatable about a pivot axis passing through the grooves of the two pivot pins 88 where the lever 87 is maintained by means of a spring 89. The lever 87 has two arms 90 and 91 apt to engage the cassette in order to lower it, while the end of another arm 92 of the lever 87 cooperates with the cam 59 to cause the rotation of lever 87 about its pivot axis. The spring 89 serves also to maintain the arm 92 in contact with the cam 59.

An elbow lever 93, corresponding to the lever 28 of FIG. 1, is hinged at 94 to the frame 50 and presents a first arm 95 cooperating with the cam 60 and a second arm 96 cooperating with a pivot pin 97 fixed onto the support 98 for the magnetic heads and pressure roller.

As for the basic scheme of FIG. 1, the operation takes place with the insertion of the cassette, which comes in contact with the appendix 75 of the hook 73 and thus causes the rotation in a clockwise direction (as viewed in FIG. 2) of the hook 73, which engages the cassette with its hook-shaped end 76. By pushing further the cassette, it causes the rotation in a counterclockwise direction (as viewed in FIG. 2) of the lever 66 against the action of the spring 71.

The lever 76 thus activates the microswitch for the start of the motor. The operation now proceeds automatically giving place to the insertion of the cassette up to the point where the appendix 75 hits against the frame 50 and the hook 73 frees the cassette, at the same time engaging with the protuberance 77 the notch 86 of the cursor 78 up to the point of causing its outward movement.

In the meantime, the cassette is being lowered by the pivot lever 87 and the magnetic heads are approached to the tape by the elbow-shaped lever 93.

When the magnetic heads and the pressure roller are in their operative position, the pivot pin 63 causes the disengagement of the transmission. The shaft 55 remains blokced as long as a lever 99 of the wheelwork remains blocked.

When the user pushes axially the pushbutton 85 in an inward direction and thus the cursor 78 is moved until the end 83 touches the tab 84, making an electric contact with the same, then the lever 99 is freed and the shaft 55 rotates under the action of the spring 58, effecting the execution of the reverse sequence.

It is to be noted that the bistable spring 49 serves to urge the cursor 78 into either its introduction or ejection positions.

It is obvious that numerous and different variations may be made by those skilled in the art to the above described embodiment of the present invention, without departing from the scope of the same; it is understood that all said variations fall within the scope of the invention.

I claim:

1. Device for the programmed control of the operative sequences for a cassette-type tape recorder having a tape transport mechanism moved by a motor and a support for the magnetic heads and for the pressure roller, which device comprises: a shaft which can be rotatably moved in a predetermined direction by a wheelwork connected to said motor; a spring which tends to cause the rotation of said shaft in the opposite direction; first, second, third and fourth control means disposed on and rotatable with said shaft; means of introduction and ejection of the cassette into and out of said tape recorder sensible to said first control means; means for lowering and for raising the cassette in said tape player sensible to said second control means; approach and removal means to and from the cassette of the support for the magnetic heads and the pressure roller, sensible to said third control means; engagement and disengagement means for the wheelwork, sensible to said fourth control means, and means for selectively rotating said shaft in said predetermined direction by said motor causing a predetermined sequence of operations controlled by said first, second, third, and fourth control means, and for selectively rotating said shaft in the opposite direction by said spring to cause the opposite sequence of operations.

2. Device according to claim 1, in which said spring is a flexure working torsionally operative helicoidal spring disposed about said shaft.

3. Device according to claim 2, in which said first and said fourth control means consist of two pins.

4. Device according to claim 3, in which said second and said third control means consist of two cams.

5. Device according to claims 1, 2, 3, or 4, in which said means of introduction and expulsion of the cassette comprise a first lever hinged to the frame and sensible to said first control means; a second lever resiliently urged against said first lever and having a first end pivotally mounted on the frame; and a hook hinged at the other end of said second lever.

6. Device according to claim 5, in which there is also provided a cursor reciprocated with respect to the frame by said hook.

7. Device according to claims 1, 2, 3, or 4, in which said means for lowering and raising the cassette comprise a pivoted lever, rotatable about an axis and having a first arm for engaging the cassette and a second arm sensible to said second control means.

8. Device according to claims 1, 2, 3, or 4, in which said approach and removal means of said support comprise an elbow lever pivotally mounted on the frame and having a first arm of engagement of the support and a second arm sensible to said third command means.

9. Device according to claim 5, in which said means for lowering and raising the cassette comprise a pivoted lever, rotatable about an axis and having a first arm for engaging the cassette and a second arm sensible to said second control means.

10. Device according to claim 5, in which said approach and removal means of said support comprise an elbow lever pivotally mounted on the frame and having a first arm of engagement of the support and a second arm sensible to said third command means.

11. Device according to claim 9, in which said approach and removal means of said support comprise an elbow lever pivotally mounted on the frame and having a first arm of engagement of the support and a second arm sensible to said third command means.

12. Device according to claim 6 wherein said cursor is slidably reciprocal with respect to the frame by said hook.

13. Device according to claim 6, wherein said cursor is slidable reciprocal with respect to the frame by said hook, and wherein a manual eject button is mechanically coupled to said cursor wherein manual actuation of said button causes ejection of a cassette inserted into the tape recorder utilizing the device of the present invention.

* * * * *